(12) United States Patent
Andrews et al.

(10) Patent No.: US 6,900,762 B2
(45) Date of Patent: May 31, 2005

(54) METHODS AND APPARATUS FOR LOCATION DETERMINATION BASED ON DISPERSED RADIO FREQUENCY TAGS

(75) Inventors: Michael R. Andrews, Berkeley Heights, NJ (US); Tin Kam Ho, Cedar Grove, NJ (US); Gregory P. Kochanski, Dunellen, NJ (US); Louis J. Lanzerotti, Morristown, NJ (US); David J. Thomson, Kingston (CA)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/261,112

(22) Filed: Sep. 30, 2002

(65) Prior Publication Data

US 2004/0061646 A1 Apr. 1, 2004

(51) Int. Cl.[7] ............................ G01S 3/02; G01S 1/08; G01S 1/24
(52) U.S. Cl. ....................... 342/463; 342/386; 342/387; 342/464
(58) Field of Search ............................... 342/463, 464, 342/465, 387, 386

(56) References Cited

U.S. PATENT DOCUMENTS

| | | | | |
|---|---|---|---|---|
| 5,497,140 A | | 3/1996 | Tuttle | |
| 5,604,765 A | * | 2/1997 | Bruno et al. | 455/456.1 |
| 5,646,592 A | | 7/1997 | Tuttle | |
| 5,787,174 A | | 7/1998 | Tuttle | |
| 5,831,531 A | | 11/1998 | Tuttle | |
| 5,914,671 A | | 6/1999 | Tuttle | |
| 5,990,826 A | * | 11/1999 | Mitchell | 342/386 |
| 6,112,152 A | | 8/2000 | Tuttle | |
| 6,127,917 A | | 10/2000 | Tuttle | |
| 6,529,164 B1 | * | 3/2003 | Carter | 342/463 |

FOREIGN PATENT DOCUMENTS

WO    WO 9845728 A1 * 10/1998 ............. G01S/1/68

* cited by examiner

Primary Examiner—Thomas H. Tarcza
Assistant Examiner—Fred H. Mull

(57) ABSTRACT

Systems and techniques for location determination. A plurality of tags emitting radio frequency signals are dispersed throughout a region, such as a building, within which a user's location is to be determined. The radio frequency signals emitted by the tags include information that can be used to identify the location in which the tags axe placed, or simply to distinguish the tags from one another. A portable device receives signals from the tags and provides the signal information to a location server that computes the location of the portable device by comparing the signal information received from the portable device to a map of location venus stored signal information, and identifies the location of the portable device as the location for which the stored signal information best matches the signal information received from the portable device.

20 Claims, 5 Drawing Sheets

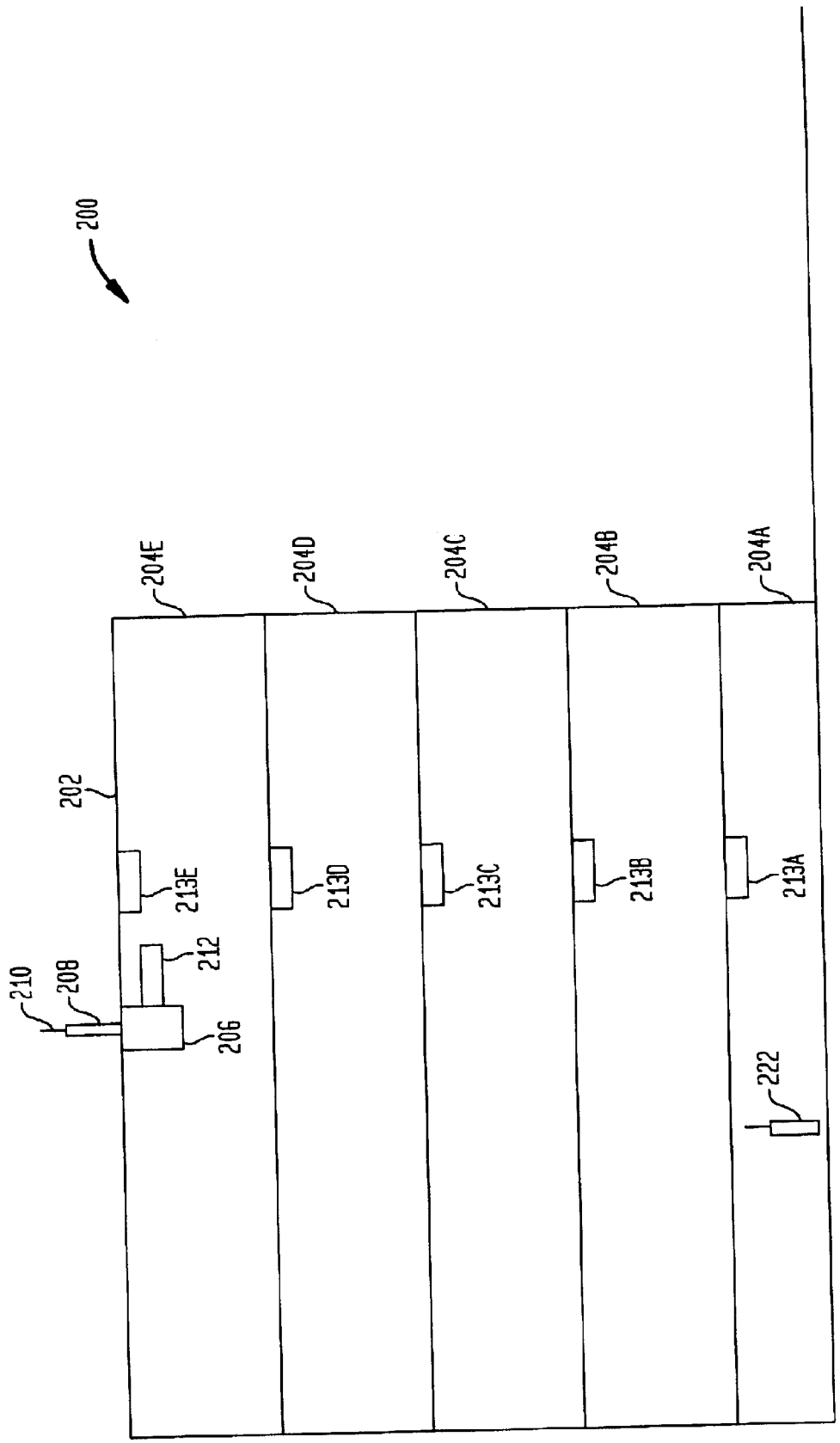

METHODS AND APPARATUS FOR LOCATION DETERMINATION BASED ON DISPERSED RADIO FREQUENCY TAGS

FIELD OF THE INVENTION

The present invention relates generally to improved techniques for location determination. More particularly, the invention relates to techniques for determining the location of a portable device based on signals received from radio frequency tags dispersed throughout a region within which the location of the portable device is to be determined.

BACKGROUND OF THE INVENTION

Identifying the location of a wireless telephone making an emergency call is a matter of great importance and intense interest. Unlike a landline telephone whose telephone number is associated with a particular address, wireless telephones can be used from anywhere and knowledge of the telephone number of the wireless telephone making the call contributes nothing toward the knowledge of the location of the wireless telephone at the time of the call.

Global positioning system (GPS) receivers have great value in determining the location of a user, but the use of a GPS receiver is not a reliable solution for determining the location of a user inside a building, especially in a critical application such as providing a user's location to an emergency call system. It is possible for a receiver with a good view of the sky to determine its position. Such a receiver can be integrated into a wireless telephone and a wireless telephone from which an emergency call is made can transmit location information provided by the GPS receiver to the central exchange, which in turn can relay this information to emergency personnel. However, even in outdoor use, GPS has drawbacks that detract from its desirability as the sole source of location information in critical situations. A GPS receiver may take several minutes to achieve a location fix, particularly if the GPS receiver has been transported more than a few hundred miles since last achieving a location fix. Moreover, if obstructions prevent the receiver from achieving a clear line of sight to a sufficient number of satellites, the receiver may fail to achieve a fix.

The use of a GPS receiver within a building introduces even more difficulties. Most building materials obstruct the receiver's view of satellites, preventing the receiver from achieving a location fix. In addition, the accurate determination of a location within a building requires altitude information as well as latitude and longitude information, and the altitude information provided by a GPS is much less accurate than the latitude and longitude information provided. GPS should not be relied on to determine location in a building in critical applications such as location identification of a telephone making an emergency call.

There exists, therefore, a need for location identification systems and methods that will operate within a building.

SUMMARY OF THE INVENTION

A system of wireless telephone location identification according to an aspect of the present invention employs a set of radio frequency (RF) tags dispersed throughout a building. The location of a wireless telephone or other device employing the tags for location identification is determined by receiving and processing signals received from tags in the vicinity of the device. If signals from multiple tags are employed in determining the location, it is possible to uniquely identify a location even if two or more tags from which signals are received are not unique. The reason for this is that the combination of signals received is highly likely to be unique, even if two or more individual tags are not unique. The tags may be mapped to their locations by moving through the building, suitably once per year, with a device that records signals from the tags and associates each signal with the building and room number in which the tag is located. The mapping information obtained by this procedure can be stored in a location server associated with the building or with an emergency call, or 911, network. Depending on the particular tags employed, the mapping may be accomplished by associating locations with location vectors comprising characteristics of a number of symbols, by associating locations with specific codes or by associating locations with possible paths that may be used to reach the locations.

When a wireless telephone user makes a 911 call, his or her telephone may receive signals from nearby tags and then transmit the signals to the location server. Alternatively, depending on the tag configuration employed, the telephone may retrieve stored signal information previously received. The location server processes the signals to determine the location of the wireless telephone. If the location server is a part of the 911 network, it sends the location information along with the wireless call. Otherwise, the location server returns the location information to the telephone for transmission to the 911 network.

A more complete understanding of the present invention, as well as further features and advantages of the invention, will be apparent from the following Detailed Description and the accompanying drawings.

BRIEF DESCRIPTION OF THE DRAWINGS

FIG. 2A illustrates an alternative location identification system in accordance with the present invention which employs a hierarchical arrangement of tags transmitting specific location identification;

DETAILED DESCRIPTION

Figure 1:
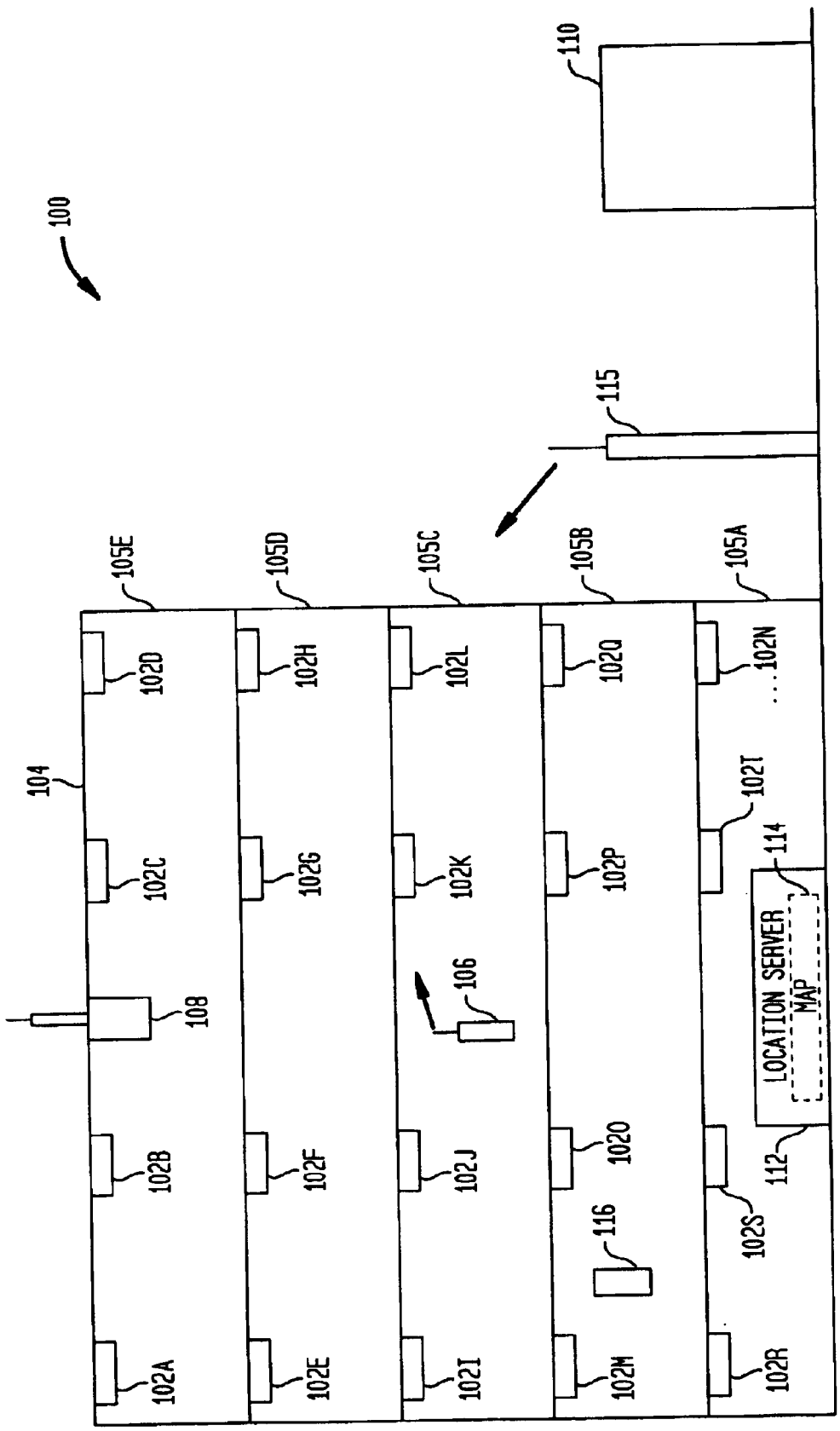
FIG. 1 illustrates a location identification system according to the present invention.

FIG. 1 illustrates a location identification system 100 according to an aspect of the present invention. The system 100 includes a plurality of identifier tags 102A . . . 102N dispersed throughout a preferably three dimensional, such as a building, within which a user's location is to be determined. In the example illustrated here, the representation of the region is a vertical layout of a building 104, showing the floors 105A–105E.

The user's location is determined by a portable device such as a wireless telephone 106 that receives signals from a nearby one or ones of the tags 102A . . . 102N, such as the tags 102J and 102K. A central location broadcaster 108 may suitably be located in the building 104, broadcasting geographic coordinates, such as address, latitude and longitude or the like in such a way that this information can be received by the telephone 106 or by any other portable devices that may need to use such information. When the user makes a call to an emergency system 110, the telephone 106 sends the signals received from the tag or tags, as well as the geographic coordinates received from the location broadcaster 108, to a location server 112. The location server 112 may be external to the emergency system 110, or may be a part of the emergency system 110. If the location server 112 is a part of the emergency system 110, the location server receives the signals from the emergency system 110 and returns the user's location to the emergency system 110. If the location server 112 is external to the emergency system 110, the location server 112 returns location information to the telephone 106 and the telephone 106 then transmits the location information to the emergency system 110 along with the telephone call.

The location server 112 stores a map 114 of signals to locations. The map 114 may suitably be constructed by walking through the building 104 with a portable device 116. The portable device 116 is designed to receive signals emitted by the tags 102A . . . 102N, to receive a user input designating the location of the device 116, for example a room number, and to record the signals that are being received when a particular location is entered by the user. The signals may suitably be recorded as a signal vector or location vector, designating various characteristics of the signals being received, such as the identity of the tag emitting each signal, the strength of each signal and the like. During or after the user has walked through the building with the device 116, the information recorded by the device is stored as the map 114. The location server 112 identifies the location of the wireless telephone 106 by receiving a location vector from the telephone 106, the location vector providing relevant information relating to the signals being received by the telephone 106 such as identification information indicating which tags provided the signals, power of each signal and the like. The location server 112 then compares the location vector received from the telephone 106 with the location vectors stored in the map 114, and selects the location vector most nearly comparable to that received from the telephone 106. The location of the telephone 106 is identified as the location associated with the selected location vector.

A variety of different choices may be made for the tags 102A . . . 102N, the communication between the tags 102A . . . 102N and the telephone 106 and the techniques used by the location server 112 to compute the location of the telephone 106 as indicated by the tags.

In one exemplary embodiment, the tags 102A . . . 102N may suitably be active transmitters synchronized to a 60 Hz power line typically found in a building. That is, each tag may be designed so as to divide each cycle into 100 time slots and broadcast a signal burst in one or more of the time slots. The tags 102A . . . 102N may be designed so that the time slot within which each tag broadcasts is always the same for that tag but differs from other tags. The time slots may be assigned randomly, sequentially as each tag is manufactured, or using some other system chosen to insure that a random selection of tags will very likely include a substantial number of tags broadcasting in different time slots. Synchronization of the tags may be accomplished by wiring them into an electric power supply of the building 104 in which they may be placed. Alternatively, the tags may be powered and synchronized by photovoltaic cells placed near fluorescent light fixtures because such fixtures flicker at the frequency of their power supply. Preferably, each transmitter generates two or more pulses per cycle. Such a design allows the tags 102 . . . 102N to be distinguished by the difference in time between the pulses, without reference to the power line frequency. Preferably, the number of available time slots may be defined as N, where $10<N\leq1000$ or even more advantageously $30<N<100$. Each transmitter preferably generates M pulses, where the value of M is no less than the lesser of N/2 and 10 and no greater than the greater of N/2 and 40. The best values for N and M may suitably be defined by experiment, representing a compromise between two goals. The first goal is the transmission of at least 20 bits of identity information so that the signal from a single one of the tags 102A . . . 102N would be sufficient to identify the location in which the tag is placed. The second goal is restricting the number of time slots to a small enough value so that phase shifts in the power line signal do not shift pulses from one time slot to another.

In order to identify its location, the telephone 106 may suitably record the power of the signal received in each time slot, suitably taking the average or median of the power received over several cycles of the power line. When querying the location server 112 for its location, the telephone 106 sends the recorded power values to the server 112, together with the time slot in which each power value is received.

Upon receiving a query from the telephone 106, the location server 112 compares the power values received from the telephone 106 against previously stored power values that have been mapped against locations, and may optionally include other information to be utilized in the comparison process, for example the knowledge that the telephone 106 is communicating with a particular base station 115. As noted above, the location server 112 is supplied with or computes a location vector for each room during initial mapping of the tags 102A . . . 102N. This location vector identifies directions and distances to selected tags. When the location server 112 is queried by the telephone 106, the query may suitably include a location vector identifying those of the tags 102A . . . 102N from which transmissions are being or have recently been received. As a response to the query, the location server 112 returns the location whose location vector best matches the location vector in the query.

The location identification performed by the location server 112 should be robust against failures of individual ones of the tags 102A . . . 102N. One suitable technique employed to provide such a robust identification is to choose a number of sets of time slots in which some of the time slots are to be ignored in making the comparisons, randomly choosing Q sets of time slots to ignore, and then to compute the most probable location of the telephone 106 for each set of remaining slots. In each set of time slots in which some of the time slots are ignored, typically between 5% and 50% of the time slots are ignored, with the more standard case being that between 10% and 50% of the time slots are ignored.

Every time slot should be ignored by one set or another, so that any defective tag would be ignored at least once. The comparison would be repeated a predetermined number of times, with a different set of time slots being ignored each time, and the most probable location of the telephone 106 being computed and stored for each repetition. The location server 112 then identifies the location of the telephone 106 as that being computed most often. However, if the same location was not identified at least Y times, with Y being a predetermined number, the location server 112 concludes that the location was unknown. If a specific location such as a room cannot be reliably identified but a larger region such as a floor or building can be reliably identified, the location server 112 identifies and returns the identification of the larger region. Floor information in particular is highly valuable and restricting the search to a single floor greatly simplifies a search.

As a further technique to compensate for failure of one or more tags, the wireless telephone 106 may be designed to collect signals periodically whenever it is turned on. The set of data collected when a 911 call is made can be transmitted to the location server 112, and the set of data most recently collected may be transmitted at the same time. If the location server 112 is not able to compute a reliable location from the information collected at the time the call is made, it attempts to compute the location using the previously collected data, and returns that location, identifying it as a recent location of the user. By returning a recent location of the user when the present location cannot be computed, the location server 112 is able to provide a reasonable starting point for emergency personnel in searching for the user. In addition, the telephone 106 may be designed to collect signal information from the transmitter 108 whenever the telephone 106 is turned on and to return the information from the transmitter 108 to a call center whenever an emergency call is made. In this way, the telephone 106 is guaranteed to return at least the signal information received from the transmitter 108, isolating the search to the region defined by the transmitter 108.

If desired, a transmitter similar to the transmitter 108 could be placed on each floor of the building 104 in order to broadcast floor identification. In such a case the telephone 106 would collect region information, for example a building identification code, and floor information whenever it was turned on, allowing the telephone 106 to identify a particular floor to an emergency call center when an emergency call is made.

In addition to using mapping of the tags to define locations, it is possible to define a more general region by correlating codes from nearby tags. For example, each of the tags 102A–102D may be located on a particular floor of a building and may suitably be chosen to transmit a particular bit pattern as its signal, with the bit pattern being the same for each of the tags 102A–102D. In this way, a telephone 106 could be identified as being on a particular floor if it received a particular bit pattern, with the specific location on the floor being computed by examining the time slots in which the nearby tags were broadcasting.

As an alternative to using tags that simply broadcast specific information in order to distinguish them from one another, it is also possible to use tags that transmit signals with information specifically identifying their location.

As an alternative to simply broadcasting information distinguishing tags from one another, the tags 102A . . . 102N may alternatively be configured to actively broadcast information positively identifying a location such as a room. Each of the tags 102A . . . 102N may broadcast a particular code that is mapped to a particular room, so that when the wireless telephone 106 receives the code, it transmits the code to the location server 112, which then identifies the location associated with the code. The information or code transmitted by one of the tags 102A . . . 102N may suitably define coordinates of the building 104 as well as a room number or other identifier of each room or location in which the tag is operating. Preferably, each of the tags 102A . . . 102N periodically broadcasts a signal containing its programmed location information along with error correcting codes and the date at which it was programmed. As a user moves through the building 104 carrying the wireless telephone 106, the telephone 106 receives and stores signal from nearby transmitters, storing the last few signals received along with the time at which the signal was received and a measurement of the signal strength. When the wireless telephone 106 is used to make an emergency call, the telephone 106 computes a figure of merit for each of the stored signals and selects the signal with the best figure of merit. Factors influencing the figure of merit may suitably include how long ago the tag producing the signal was programmed, how recently the signal was received and the signal strength. The telephone 106 identifies the location associated with the signal having the best figure of merit and reports it to the emergency system 110. Alternatively, the telephone 106 transmits a copy of the signal or information extracted from the signal and a location server 112 looks up the correct location using the information contained in the signal.

As a further alternative to the above embodiment, a system may be designed having a hierarchy of transmitters, each identifying a smaller region. A building may, for example, have four classes of tags, with a first broadest class identifying the building, the second class identifying the floor, a third class identifying a section of a floor and the fourth most specific class identifying a room. A wireless telephone would receive signals from each class of tag within which it was in range, analyze the signals to identify the tag identifying the region in which the wireless telephone was located and identify the specific location of the tag using the combined information provided by the tags.

Figure 2B:
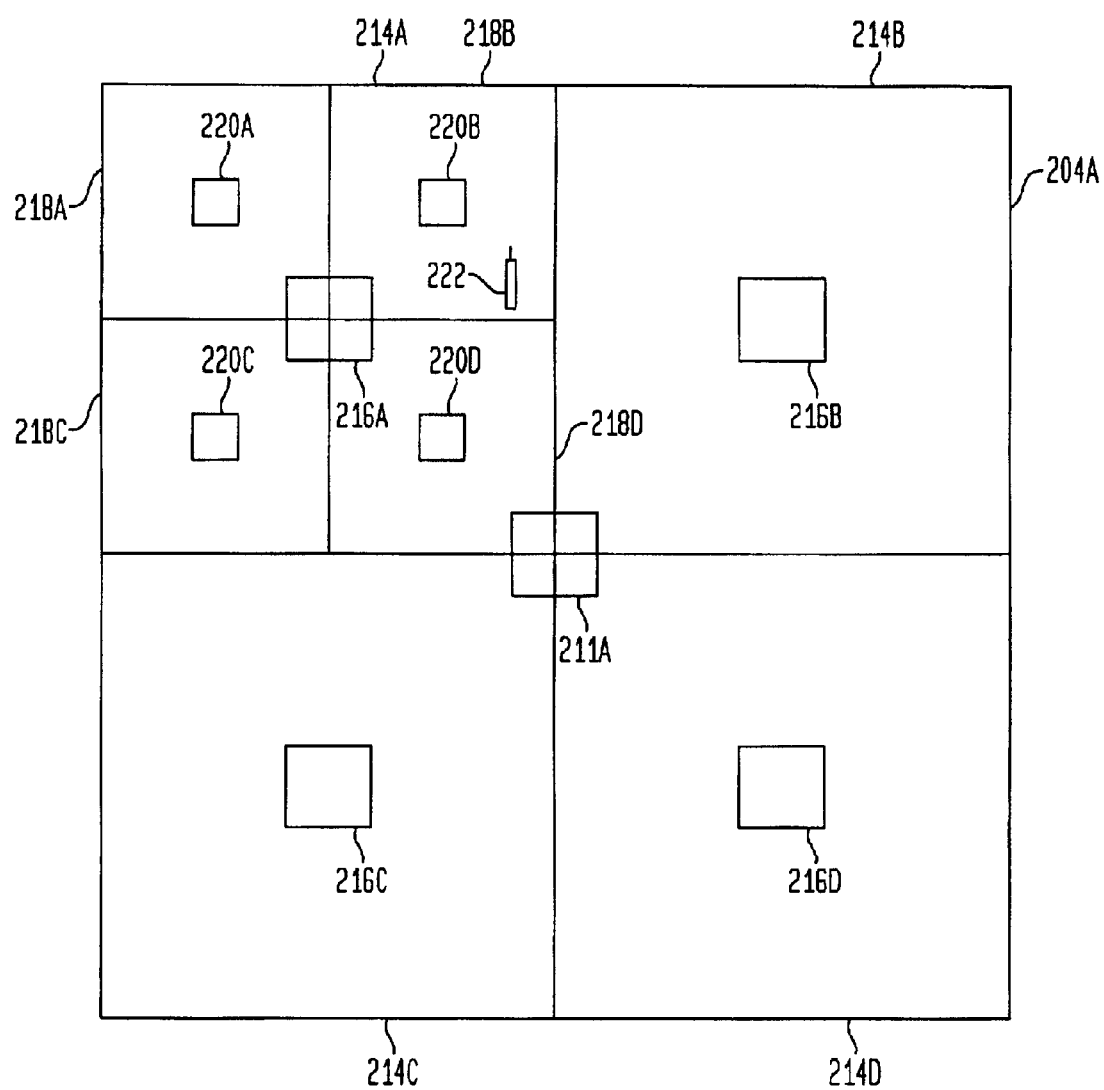
FIG. 2B illustrates additional details of the location identification system of FIG. 2A.

FIG. 2A illustrates an alternative location identification system 200 according to an alternative aspect of the present invention. The system 200 may suitably be deployed in a building 202 having a plurality of floors 204A–204E. An active transmitter 206 is installed in the building 202 and provides a signal identifying the location of the building 202. The transmitter 206 may receive the location of the building from a GPS receiver 208, the GPS receiver having previously achieved a location fix and continuously maintaining the location fix. In such an implementation, the GPS receiver 208 is preferably located atop the building 202 or attached to an antenna 210 with a clear view of the sky. If desired, the building coordinates can be determined using a GPS receiver or in some other way and the coordinates can be stored in a memory 212 accessible to the transmitter 206. The floors 204A–204E include tags 213A–213E, respectively. Each of the tags 213A–213E may suitably be an active transmitter, broadcasting a signal identifying the floor. Each of the floors 204A–204E further includes a plurality of additional tags identifying subsections of the floor such as areas and rooms. These tags and subsections are illustrated in FIG. 2B for a single floor 204A and discussed further below.

FIG. 2B illustrates the floor 204A in detail. The floor 204A is subdivided into four quarters or sections 214A–214D. The floor 204A includes tag 211A, which emits a signal identifying the floor 204A. Each of the sections 214A–214D includes a tag 216A–216D, respectively, with each of the tags 216A–216D emitting a signal identifying the section 214A, 214B, 214C or 214D in which that respective tag is located. Each of the sections 214A–214D may include a plurality of rooms, as illustrated In FIG. 2B, wherein the section 214A is shown as including four rooms 218A–218D. Each of the rooms 218A–218D includes a further tag 220A–220D, respectively, which transmits a signal identifying the room in which it is located. A wireless telephone 222 carried by a user receives signals from the transmitter 206 and all of the tags 211A, 216A–216D and 220A–220D that are within range, determines which of the tags within the various groupings should be used in defining the location of the telephone 222 and then computes the correct location using the selected tags.

A system similar to the system 100 or 200 may be constructed employing passive resonators as tags, rather than active transmitters. A passive resonator is a device that receives a signal and echoes a signal characteristic of the device. For relatively small buildings, passive resonators can provide enough information so that every room, floor or other location of interest can be uniquely identified. It is known that a simple copper foil resonator can have three or four independently controllable resonances. Information can be coded into such a device as the frequencies of these resonances. For example, if 10 frequency slots are available, a resonator with three resonances can have any one of $$\frac{10*9*8}{3!}, \text{ or } \frac{720}{3!},$$

that is, 120, configurations, and could then distinguish up to 120 individual rooms. In most applications, some of the information provided by the tags would be used for error correction, so that fewer different rooms could be distinguished. In such a system, a wireless telephone or other portable device would transmit an interrogation signal and each tag within range would respond to the interrogation signal with a response signal employing the characteristic resonance of the tag. The portable device would collect the information provided by the response signals, and this information would be used to compute the location of the portable device.

If desired, the passive resonators to be used may be programmed with random numbers during fabrication. Such tags might be built into normal construction materials, such as floor or ceiling tiles. Typically, one of every 3 to 300 floor or ceiling tiles would contain a tag. The proportion of ceiling tiles containing tags would be determined based on factors such as the range from which emissions from the tags could be detected. In a building with offices of 100 square feet, one tag would typically be provided for every 10 to 50 square feet of floor space. Each tag would typically have between 1 and 6 resonances, with preferably two or more. The resonances would be spaced among 10 or more distinguishable frequencies. Another attractive alternative would be to place passive resonators providing location information into room identification tags typically located by the doorways of rooms in office buildings.

Passive resonators are typically not able to provide as much information as are active transmitters. In order to overcome the limitations on the information available from a single passive resonator, a system of tags according to an alternative aspect of the present invention employs passive resonators which, in combination, are able to provide a considerable number of bits of information, even though the number of bits provided by any single tag is relatively small.

Figure 3:
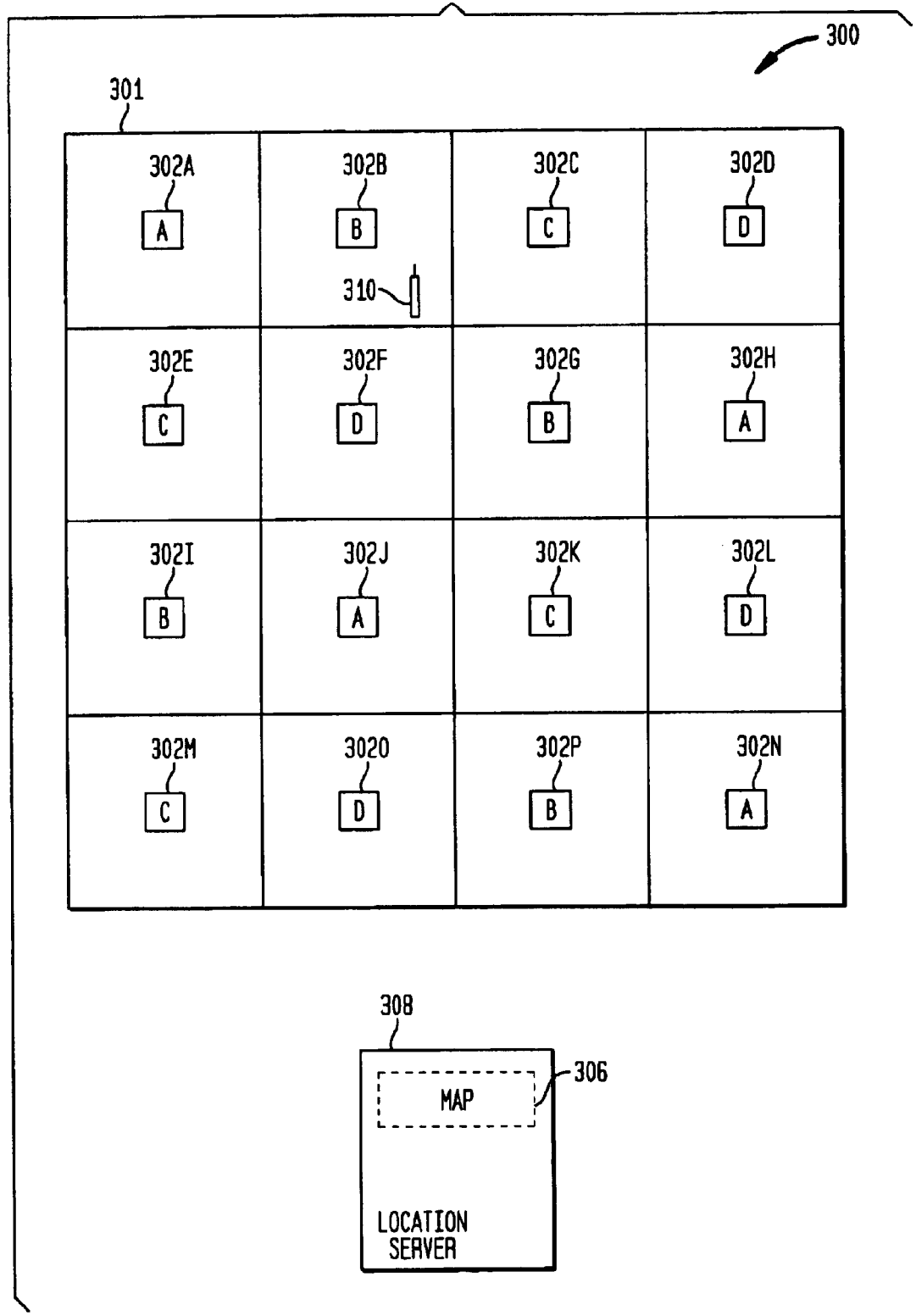
FIG. 3 illustrates an alternative location identification system in accordance with the present invention which employs tags configured as passive resonators.

FIG. 3 illustrates a system 300 according to the present invention, deployed in a floor 301 of a building. The system 300 employs a plurality of tags 302A . . . 302N, each tag comprising a configuration of radio frequency (RF) resonators. In the present exemplary embodiment, the tags are designed so that each tag employs a combination of resonators and frequency slots that provides three bits of information per tag. In order to allow for error correction, the tags are used to construct a distance 5 error correcting code carrying approximately two bits of information per tag. A distance 5 code is a code wherein the nearest adjacent code words differ from one another by at least 5 bits.

The tags 302A . . . 302N are dispersed throughout the floor 301. For simplicity of illustration, only a single floor 304 is shown here, but in practice a set of tags 302A . . . 302N will be dispersed throughout an entire building and used to identify a location anywhere in the building.

If each tag carries only two bits of useful information, the tags 302A . . . 302N will therefore include only four unique tag configurations, that is, configurations labeled as "A", "B", "C" and "D". It will therefore be unlikely that any individual tag will be able to provide sufficient information to identify its location if there are more than a few tags 302A . . . 302N dispersed throughout the floor 301.

The tags 302A . . . 302N are preferably distributed so that identical ones of the tags 302A . . . 302N are as far apart as possible. Identical tags are not placed adjacent to one another. The placement of the tags and the code associated with each tag is recorded on a map 306 stored on a location server 308. Tags are placed in a pattern chosen to optimize the topology of the walkways in the floor 301 and in the building where the floor 301 is located. Tag distribution is more dense near building entrances and elevators.

As a user carries a wireless telephone 310 through the floor 301, or other similar floors in a building containing the floor 301, the telephone 310 transmits an interrogation signal. Tags within range of the telephone 310 respond to the signal, with each tag providing its characteristic code. The telephone 310 records the responses it has received. For example, depending on the path taken through the floor 301, the telephone 310 may receive the sequence of responses ABDACAB, ABDC, ADABAC, or other sequences of responses depending on the particular codes characteristic of the tags it has passed. A relatively small number of locations is illustrated here, and consequently the possible paths are relatively short. In practice, however, with a large number of rooms, paths will tend to be longer and will be more likely to be unique.

When the telephone 310 is used to place an emergency call, it transmits the responses received to the location server 308. The location server 308 searches for all possible paths through the building that would reproduce the observed sequence of codes. The search preferably includes the possibility of missing a tag, of doubling back a path and of taking elevators and stairs. The location server 308 returns the most likely location to be reached by the observed path.

Figure 4:
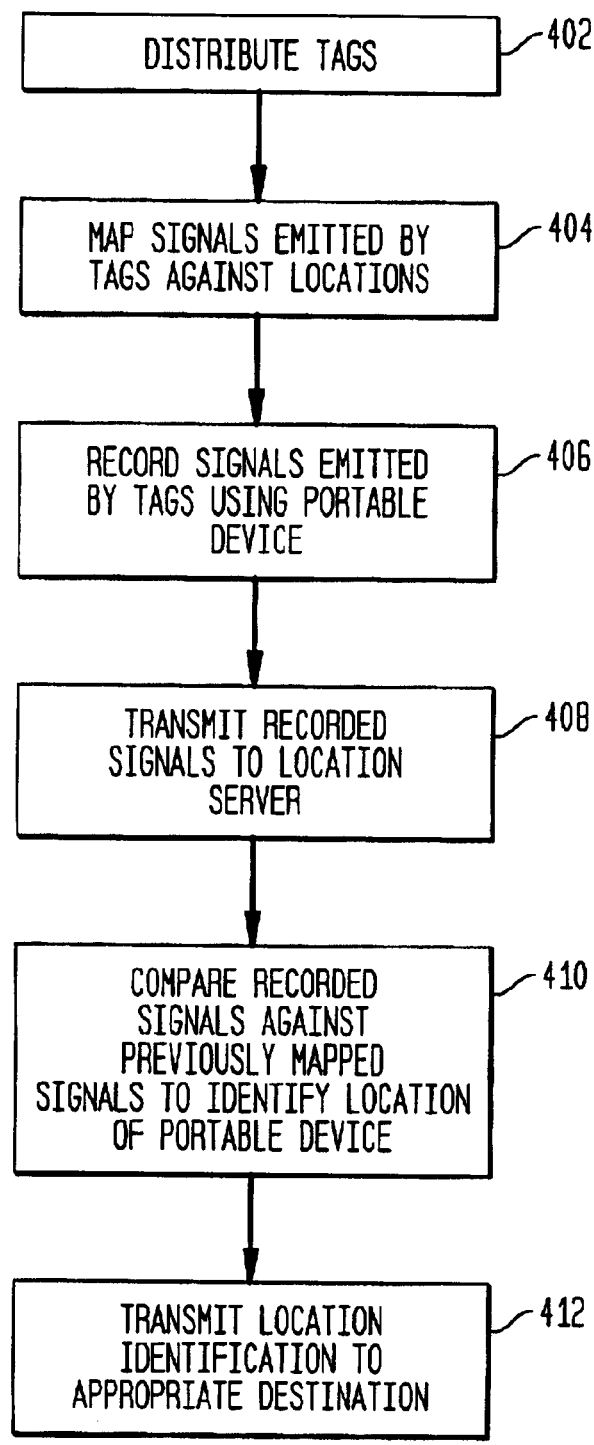
FIG. 4 illustrates a process of location identification according to the present invention.

FIG. 4 illustrates a process 400 of location identification according to the present invention. At step 402, a plurality of tags is distributed throughout a region, such as a building, within which it is desired to identify the locations of users. The tags may suitably be active transmitters transmitting location information, may be active transmitters transmitting distinguishing information or may be passive resonators. At step 404, the signals emitted by the tags are mapped against their locations with the map being stored in a location server. The mapping may be accomplished by recording signals received from each of a plurality of locations, identifying the locations and storing the signals and their associated locations. Depending on the type of tag employed, this mapping may be done by storing codes and their associated locations, storing signal vectors and their associated locations or storing the various possible paths to reach each location. The mapping may suitably be repeated any time the locations to be identified have changed, for example when rooms are added or modified, or when the tags have changed, for example when tags have failed and been replaced.

At step 406, as a user moves through the building, a device such as a wireless telephone carried by the user records and stores signals received from the tags. At step 408, when the location of the user is to be identified, for example when the user is making an emergency call, the user device sends the recorded signals to the location server. At step 410, the location server compares the recorded signals received from the user device to the previously stored signals and identifies the user's location by selecting the best match between the previously stored signals and the signals received from the user. At step 412, the user's location is transmitted to an appropriate destination, for example to the user's device for relaying to an emergency call system or directly to the emergency call system.

Experimental results employing active transmitters as illustrated in FIGS. 1 and 2, and passive resonators as illustrated in FIG. 3, show that the systems described above yield a reasonable likelihood of isolating a wireless telephone or other wireless device used to perform location identification to a single room and a very high likelihood of isolating a telephone to one of two adjacent rooms. That is, if the wireless device is identified as being in a particular room, the likelihood that the device is in either the identified room or an immediately adjacent room is very high.

The experimental assumptions were that each telephone records power received during N allocated time slots. After averaging for noise reduction, the power levels P(t) at each of the N time slots where t=1, . . . , N, are taken as a feature vector. These feature vectors are used to predict the identification of the transmitter closest to the telephone at the time when the power is recorded.

Two test buildings A and B are assumed. Both buildings consist of 10 floors. Each floor is of the same configuration with 10 hallways. Building A has 10 rooms along each hallway and building B has 100 rooms along each of its hallways. All rooms are of the same shape and size, that is, 4×4×4 cubic meters. Building A has a total of 1,000 rooms and building B has a total of 10,000 rooms. It is also possible to identify locations as being in open space or hallways, but for the purposes of conducting a simulation to determine the effectiveness of location identification it is not necessary to distinguish such spaces from ordinary rooms.

The goal of classification is to identify a particular room where a wireless telephone or other device is located, that is, to discriminate between 1,000 or 10,000 classes, respectively, using feature vectors.

The identification of a room is coded as a bit vector that is transmitted by tags configured as active transmitters or alternatively echoed by the tags configured as passive resonators or reflectors. For active transmitters, such as those described in FIGS. 1, 2A and 2B, it was assumed that each room has one transmitter mounted on the ceiling at the center of the room. For the passive devices, such as those of FIG. 3, it was assumed that one or more RFID tags can be used to echo the necessary channels. The number of tags needed is the number of "on" or "one" bits in the bit vector designated to represent that room divided by the maximum number of channels built into each tag. For convenience, it is also assumed that the passive resonators are mounted on the ceiling at the center of the room.

The bit vector representing each room is generated at installation and is fixed. This vector can be either a random bit pattern or can be derived from a specific coding scheme. In the experiments described here, it was assumed that the first 24 bits of the vector stored the binary representation of the floor/hallway/room number triplet, with 8 bits for each number. The vector was then padded with more bits each having a 50% probability of being on or off, up to a desired length. It was assumed that the active transmitters use 50 bits and the passive resonators use 48 bits.

Random samples of the location of the wireless telephone were generated following a uniform distribution within the building's space. With each sample, the power received from all nearby transmitters or reflectors was computed according to a signal decay law. With active transmitters, power received at time slot t is $$P(t) = \sum_{i=1,\ldots,k} \frac{P_i(t)}{d_i^2} e^{\frac{-d_i}{D}},$$

where $P_i(t)$ is the power transmitted by the i'th transmitter, $d_1$ is the Euclidean distance between the transmitter and the sampled location, D is a constant that represents the maximum distance beyond which the signal is assumed to fade out completely and k is the number of devices within distance D from the sampled location. D is set to 30 meters in the experiment. Power was measured in the unit of the normal power of a transmitted "on" bit, and power measurement at each channel was assumed to be at a precision of one tenth of this unit.

With passive reflectors, the power received at each time slot t is $$P(t) = \sum_{i=1,\ldots,k} \frac{P_i(t)}{d_i^4} e^{\frac{-2d_i}{D}}.$$

The vector of received power was computed for each sampled location. The resultant vectors were divided into training and testing sets with no overlap. Two statistical classifiers were compared, the nearest neighbor classifier (nn) and the decision forest classifier (dfc).

Nearest neighbor classifiers work by comparing each test vector to all training vectors and finding the training vector closest to the test vector according to a chosen metric. The test vector is then assigned the class of the closest training vector, in this case, the location associated with the closest training vector. In the experiment the metric is chosen to be Euclidean distance.

Decision forest classifiers are voting combinations of several decision trees. Each tree is constructed using training vectors projected to a randomly chosen subspace of the feature space. Each tree decides by matching the test vector to the splitting function at each internal node until a leaf node is reached. The tree then assigns the class or classes at that leaf to the test vector. After all trees have decided, a test vector is assigned to the class receiving the greatest number of votes.

In the experiments, nine trees were constructed in each forest. Training sets of different sizes are used for each building to scale for different numbers of rooms.

The accuracy of room identification for each of the hypothetical buildings was as follows. The entries represent the rates of assigning a test location to the correct room. The first percentage value in each entry was the probability of assigning a test location to the correct room, while the second percentage value in each entry, that is, the percentage value in parentheses, was the probability of assigning a test location to either the correct room or the room immediately next to it.

| Classifier (training set size) | Building A (1000 rooms) | Building B (10000 rooms) |
|---|---|---|
| Active devices | | |
| nn (#rooms * 10) | 58.50% (98.66%) | 59.22% (98.53%) |
| dfc (#rooms * 10) | 63.82% (99.53%) | 66.13% (99.11%) |
| nn (#rooms * 50) | 72.03% (99.65%) | 72.32% (99.59%) |
| dfc (#rooms * 50) | 80.25% (99.97% | 81.70% (99.94%) |
| Passive devices | | |
| nn (#rooms * 10) | 50.56% (94.07%) | 49.88% (93.05%) |
| dfc (#rooms * 10) | 58.99% (95.73%) | 57.68% (94.41%) |
| nn (#rooms * 50) | 62.43% (98.80%) | 62.32% (98.49%) |
| dfc (#rooms * 50) | 73.61% (99.17%) | 74.17% (98.83%) |

From the experimental results it can be observed that with either type of device it is possible to isolate the location as being one of two adjacent rooms to over 90% accuracy. Generally, the decision forest classifier is preferred over nearest neighbors. The accuracy depends on the training set size, that is, how many power vector samples are collected from each room at installation. The results show that 50 samples will provide very useful performance. The building size, on the other hand, does not seem to matter, since beyond a fixed distance, for example, 30 meters the signal is invisible so the existence of other rooms beyond such an immediate neighborhood does not greatly affect the results. It is expected with longer feature vectors, larger training sets, or more precise power measurements, accuracy can be further improved.

Results in actual buildings should be better than those presented here, because the absorption of RF signals in real buildings is concentrated in walls and floors. In the simulations described above, absorption has been assumed to be spread uniformly throughout the rooms.

While the present invention is disclosed in the context of a presently preferred embodiment, it will be recognized that a wide variety of implementations may be employed by persons of ordinary skill in the art consistent with the above discussion and the claims which follow below. In particular, it will be recognized that the use of the invention is not limited to the identification of a location for use with an emergency call system or with any call system, but may easily be adapted to identify a user's location for the benefit of the user.

For example, a user may employ a suitable portable device that computes his or her location and then informs the user of his or her location, for example by audibly telling the user the floor and room number. Such a system would be particularly useful to visually impaired users, or for any other user who desire help in navigating through a building, for example persons who are unfamiliar with the layout of the building. Further, the location system could be readily adapted to a security system in which it is desirable to track the movements of all entrants to a secure building or higher security area within a building.

We claim:

1. A location identification system comprising:
 a location server operative to store location identification information for each of a plurality of locations in a region, the location identification information comprising a location identifier and RF information characteristic of the location, the RF information comprising signals received at the location from ones of a plurality of RF tags distributed throughout the region, the tags being chosen and arranged such that the signals received from the tags can be used to reliably identify a location by distinguishing differences between times of transmissions of signals from said tags.

2. The location identification system of claim 1, wherein the RF information for each location is a location vector including tag identification information for each tag from which a signal is received and signal strength of each signal.

3. The location identification system of claim 1, further including a plurality of RF tags distributed throughout the region, each of the tags emitting a signal including tag identification information.

4. The location identification system of claim 3, wherein each tag emits a signal within a particular time slot of a plurality of available time slots and wherein the tag identification information includes identification of the signal emission as occurring within a particular time slot.

5. The location identification system of claim 4, wherein the location server is operative to receive a transmission indicating RF signals received by a portable device and to identify a location of the portable device by comparing RE information received by the portable device against RE information stored in association with the location identifiers.

6. The location identification system of claim 5, wherein the location server is operative to receive signal information from a wireless telephone used to make a call to an emergency call center, the signal information indicating RE information received by the wireless telephone from tags in the vicinity of the wireless telephone, the location server being operative to identify the location of the wireless telephone and to transmit the location of the wireless telephone to the emergency call center.

7. The location information system of claim 5, wherein the location server is at a location remote from the region where the tags are distributed and from the emergency call center and wherein the location server receives the signal information indicating the RF information received by the wireless telephone by remote transmission from the emergency call center.

8. A location identification system comprising:
 a location server for receiving transmissions from a plurality of tags arranged in regions wherein locations are to be identified, each lag emitting an encoded signal identifying the location in which the tag is placed, the location server being operative to store each encoded signal emitted by a tag, the encoded signal including the location in which the tag is placed, wherein the encoded signals are divided into broader or narrower classes, with encoded signals in broader classes identifying larger regions and encoded signals in narrower classes identifying smaller regions within the larger regions, and wherein the location server associates a particular location with all encoded information defining the location, wherein the location server is further operative to receive a transmission from a portable device, the transmission representing encoded signals received by the portable device in order to allow the location server to identify the location of the portable device, and wherein the transmission from the portable device includes evaluation information for evaluating the encoded information received by the portable device, including the signal strength of a signal containing the encoded information, the time when the signal was received and the date when the tag emitting the signal was programmed with the encoded information and wherein the location server uses the evaluation information to determine which signals are to be used to identify the location of the portable device.

9. A method of location identification for a wireless device, comprising the steps of:

dispersing a plurality of radio frequency tags throughout a volume within which the location of the wireless device is to be identified, each tag emitting a signal including identifying information, the tags being chosen and arranged such that the signals received from the tap can be used to reliably identify a location by distinguishing differences between times of transmissions of signals from said tags;

mapping the signals emitted by the tags against locations within the volume; and storing a map of locations to signal characteristics.

10. The method of claim 9, further comprising:

receiving signals emitted by the tags at a wireless device;

comparing signals emitted by the tags against the map of locations to signal characteristics; and identifying the location of the wireless device as the location indicated by the map as the location wherein the signal characteristics most closely match those experienced by the wireless device.

11. The method of claim 10, wherein the step of receiving signals emitted by the tags at a wireless device includes sequentially receiving signals as the device moves in a path through the volume and wherein identifying the location of the wireless device includes identifying the location arrived at by following a path indicated by the sequentially received signals.

12. The method of claim 11, wherein the tags are one of passive resonators and tags that actively transmit location information.

13. The method of claim 11, wherein the stop of identifying the location of the user further comprises analyzing the sequence of tags in a manner that accounts for the possibility of one of the tags along the path being defective.

14. The method of claim 13, wherein the sequence of radiofrequency tag signals is received at a location distant from the user and wherein the step of compiling is responsive to receiving the sequence from the user.

15. The method of claim 9, comprising: each tag emitting a signal including identifying information within a particular time slot of a plurality of available time slots, said tag identification information including identification of the signal emission as occurring within a particular time slot.

16. A program storage medium encoded with a computer executable program for performing stops of a method, the method comprising:

mapping signals emitted by a plurality of radiofrequency tags distributed throughout a region against locations within the region, the tags emitting signals including identifying information, the tags chosen and arranged so that the signals emitted by the tags may be used to reliably identify a location by distinguishing differences between times of transmissions of signals from said tags; and storing a map of locations to signal characteristics.

17. The program storage medium of claim 16, wherein the method encoded onto the medium further comprises steps of receiving a transmission from a portable device indicating RF signals received by the portable device and comparing the RF signals received by the portable device against RF signals associated with each location in the map of locations and identifying the location of the portable device as the location associated with RF signals most closely matching the RF signals received by the portable device.

18. The program storage medium of claim 16, wherein the method encoded onto the medium further comprises steps of:

compiling a sequence of radiofrequency tag identification signals along a path traveled by the user carrying the wireless device; and identifying the location of the user as the location arrived at by following a path defined by the sequence.

19. The program storage medium of claim 18, wherein the step of identifying the location of the user further comprises analyzing the sequence of tags in a manner that accounts for the possibility of one of the tags along the path being defective.

20. The program storage medium of claim 16, wherein the method encoded onto the medium further comprises: each tag emitting a signal including identifying information within a particular time slot of a plurality of available time slots, said tag identification information including identification of the signal emission as occurring within a particular time slot.

* * * * *